US005957852A

United States Patent [19]
Hossack et al.

[11] Patent Number: 5,957,852
[45] Date of Patent: Sep. 28, 1999

[54] ULTRASONIC HARMONIC IMAGING SYSTEM AND METHOD

[75] Inventors: John A. Hossack, Palo Alto; Samuel H. Maslak, Woodside; Christopher R. Cole, Redwood City, all of Calif.

[73] Assignee: Acuson Corporation, Mountainview, Calif.

[21] Appl. No.: 09/089,463

[22] Filed: Jun. 2, 1998

[51] Int. Cl.⁶ .................................................. A61B 8/00
[52] U.S. Cl. ........................................... 600/477; 600/458
[58] Field of Search .................................... 600/437, 442, 600/443, 447, 458; 73/602, 626

[56] References Cited

U.S. PATENT DOCUMENTS

| Re. 34,566 | 3/1994 | Ledley . |
| Re. 35,148 | 1/1996 | Lizzi et al. . |
| 3,617,994 | 11/1971 | Glenn et al. . |

(List continued on next page.)

FOREIGN PATENT DOCUMENTS

| 0 357 164 | 3/1990 | European Pat. Off. . |
| 0 770 352 A1 | 5/1997 | European Pat. Off. . |
| 0851241 A2 | 7/1998 | European Pat. Off. . |
| WO 98/20361 | 5/1998 | WIPO . |

OTHER PUBLICATIONS

Yang–Sub Lee, et al., "Time–Domain Modeling of Pulsed Finite–Amplitude Sound Beams." J. Acoustical Society of America, 97 (2), Feb. 1995.

William Armstrong, M.D., et al., "Position Paper on Contrast Echocardiography." American Society of Echocardiography, draft 1, Jun. 6, 1994.

Volkmar Uhlendorf, et al., "Nonlinear Acoustical Response of Coated Microbubbles in Diagnostic Ultrasound." IEEE 1994 Ultrasonics Symposium.

V.L. Newhouse, et al., "Bubble size measurements using the nonlinear mixing of two frequencies." J. Acoustical Society of America, 75 (5), May 1984.

Ted Christopher, "Finite Amplitude Distortion–Based Inhomogeneous Pulse Echo Ultrasonic Imaging." IEEE Transactions on Ultrasonics, Ferroelectrics, and Frequency Control, vol. 44, No. 1, pp. 125–139, Jan. 1997.

Robert M. Lerner, et al., "'Sonoelasticity'Images Derived from Ultrasound Signals in Mechanically Vibrated Tissues." Ultrasound in Medicine and Biology, vol. 16, No. 3 (1990).

Robert Entrekin, et al., "Real Time Speckle Reduction in B–Mode Images," Ultrasonics Symposium Proceedings, Sep. 1979.

Paul A. Magnin, et al., "Frequency Compounding for Speckle Contrast Reduction in Phased Array Images," Ultrasonic Imaging 4, 267–281 (1982).

Pi Hsien Chang, et al., "Second Harmonic Imaging and Harmonic Doppler Measurements with Albunex." IEEE Transactions on Ultrasonics, Ferroelectrics, and Frequency Control, vol. 42, No. 6, Nov. 1995.

M. Elbaum, et al., "A Wavelength Diversity Technique for Reduction of Speckle Size," Optics Communications, vol. 5, No. 3, Jun. 1972.

M. Elbaum, et al., "SNR in Photocounting Images of Rough Objects in Partially Coherent Light," Applied Optics, vol. 15, p. 2268, Sep. 1976.

Marc Gensane, "Bubble population measurements with a parametric array." J. Acoustical Society of America, 95 (6), Jun. 1994.

(List continued on next page.)

Primary Examiner—Francis J. Jaworski
Attorney, Agent, or Firm—Craig A. Summerfield, Esq.; Brinks Hofer Gilson & Lione

[57] ABSTRACT

The system described ultrasonically images a target with energy spreading transmissions. Generally, ultrasonic energy corresponding to a line focus is transmitted into a target at a fundamental center frequency. The target may or may not include contrast agents. In either case, echoes are received at a harmonic of the fundamental center frequency. Echoes are also received at the fundamental center frequency. The echoes received at the harmonic center frequency are efficiently compounding with the echoes received at the fundamental center frequency.

8 Claims, 6 Drawing Sheets

U.S. PATENT DOCUMENTS

| | | |
|---|---|---|
| 3,771,116 | 11/1973 | Farrah . |
| 4,290,310 | 9/1981 | Anderson . |
| 4,322,974 | 4/1982 | Abele et al. . |
| 4,445,379 | 5/1984 | Yamaguchi et al. . |
| 4,475,397 | 10/1984 | Riley et al. . |
| 4,534,221 | 8/1985 | Fife et al. . |
| 4,561,019 | 12/1985 | Lizzi et al. ................................ 73/602 |
| 4,569,231 | 2/1986 | Carnes et al. ............................ 73/626 |
| 4,662,222 | 5/1987 | Johnson . |
| 4,694,699 | 9/1987 | Cheeke . |
| 4,712,037 | 12/1987 | Verbeek et al. . |
| 4,783,839 | 11/1988 | Bamber . |
| 4,803,994 | 2/1989 | Burke . |
| 4,872,346 | 10/1989 | Kelly-Fry et al. . |
| 4,913,157 | 4/1990 | Pratt, Jr. et al. . |
| 5,034,931 | 7/1991 | Wells ..................................... 367/126 |
| 5,040,537 | 8/1991 | Katakura . |
| 5,111,823 | 5/1992 | Cohen . |
| 5,113,706 | 5/1992 | Pittaro ..................................... 73/626 |
| 5,115,809 | 5/1992 | Saitoh et al. . |
| 5,187,687 | 2/1993 | Burckhardt et al. . |
| 5,190,766 | 3/1993 | Ishihara . |
| 5,195,520 | 3/1993 | Schlief et al. . |
| 5,215,680 | 6/1993 | D'Arrigo . |
| 5,218,869 | 6/1993 | Pummer . |
| 5,219,401 | 6/1993 | Cathignol et al. . |
| 5,255,683 | 10/1993 | Monaghan . |
| 5,259,384 | 11/1993 | Kaufman et al. . |
| 5,357,964 | 10/1994 | Spivey et al. . |
| 5,358,466 | 10/1994 | Aida et al. . |
| 5,379,642 | 1/1995 | Rechwerdt et al. . |
| 5,379,770 | 1/1995 | Van Veen . |
| 5,380,411 | 1/1995 | Schlief . |
| 5,410,205 | 4/1995 | Gururaja . |
| 5,410,516 | 4/1995 | Uhlendorf et al. . |
| 5,417,214 | 5/1995 | Roberts et al. . |
| 5,425,366 | 6/1995 | Reinhardt et al. . |
| 5,433,207 | 7/1995 | Pretlow, III . |
| 5,438,554 | 8/1995 | Seyed-Bolorforosh et al. . |
| 5,456,255 | 10/1995 | Abe et al. . |
| 5,456,257 | 10/1995 | Johnson et al. . |
| 5,469,849 | 11/1995 | Sasaki et al. . |
| 5,479,926 | 1/1996 | Ustuner et al. . |
| 5,482,046 | 1/1996 | Deitrich . |
| 5,523,058 | 6/1996 | Umemura et al. . |
| 5,526,816 | 6/1996 | Arditi . |
| 5,540,909 | 7/1996 | Schutt . |
| 5,558,092 | 9/1996 | Unger et al. . |
| 5,560,364 | 10/1996 | Porter . |
| 5,577,505 | 11/1996 | Brock-Fisher et al. . |
| 5,579,768 | 12/1996 | Klesenski . |
| 5,579,770 | 12/1996 | Finger . |
| 5,580,575 | 12/1996 | Unger et al. . |
| 5,600,675 | 2/1997 | Engeler . |
| 5,601,086 | 2/1997 | Pretlow, III et al. . |
| 5,608,690 | 3/1997 | Hossack et al. ......................... 367/138 |
| 5,617,862 | 4/1997 | Cole et al. . |
| 5,628,322 | 5/1997 | Mine . |
| 5,632,277 | 5/1997 | Chapman et al. . |
| 5,667,373 | 9/1997 | Wright et al. . |
| 5,675,554 | 10/1997 | Cole et al. . |
| 5,678,554 | 10/1997 | Hossack et al. . |
| 5,685,308 | 11/1997 | Wright et al. . |
| 5,696,737 | 12/1997 | Hossack et al. . |
| 5,713,356 | 2/1998 | Kruger . |
| 5,724,976 | 3/1998 | Mine et al. . |
| 5,740,128 | 4/1998 | Hossack et al. . |

OTHER PUBLICATIONS

Michalakis A. Averkiou, et al., "Self–Demodulation of Amplitude–and Frequency–Modulated Pulses in a Thermo-viscous Fluid." J. Acoustical Society of America, 94 (5), Nov. 1993.

Kevin J. Parker, PhD., et al., "Sonoelasticity of Organs: Shear Waves Ring A Bell." American Institute of Ultrasound in Medicine, Ultrasound Med. II: 387–392, 1992.

K.J. Parker, et al., "Tissue Response to Mechanical Vibrations for 'Sonoelasticity Imaging'." Ultrasound in Medicine and Biology, vol. 16, No. 3, (1990).

Karrer et al., "A Phased Array Acoustic Imaging System For Medical Use," 1980 IEEE Ultrasonics Symposium , pp. 757–762.

Ken Ishihara, et al., "New Approach to Noninvasive Manometry Based on Pressure Dependent Resonant Shift of Elastic Microcapsules in Ultrasonic Frequency Characteristics." Japanese J. of Applied Physics, vol. 2 (1988), Supplement 27, pp. 125–127.

John A. Hossack, et al., "Improving the Characteristics of a Transducer Using Multiple Piezoelectric Layers." IEEE Transactions on Ultrasonics, Ferroelectrics, and Frequency Control, vol. 40, No. 2, Mar. 1993.

J.A. Hossack, et al., "Improving Transducer Performance Using Multiple Active Layers." SPIE vol. 1733 (1992).

John G. Abbott[1,2] et al., "Acoustic Speckle: Theory and Experimental Analysis," Ultrasonic Imaging 1, 303–324, (1979).

J. G. Abbott, et al., "Multi–Scan Processing in a Phased Array Imaging System", 1978 Ultrasonics Symposium Proceedings, IEEE.

Israel Amir, et al., "Analysis and Comparison of Some Frequency Compounmding Algorithms for the Reduction of Ultrasonic Clutter," IEEE Transactions on Ultrasonics, Ferroelectrics, and Frequency Control, vol. UFFC–33, No. 4, Jul. 1986.

Gordon S. Kino, "Acoustic Imaging for Nondestructive Evaluation," Proceedings of the IEEE, vol. 67, No. 4, Apr. 1979.

Fred Lee, Jr., M.D, et al., "Sonoelasticity Imaging: Results in in Vitro Tissue Specimens." Radiology, vol. 181, No. 1 (1991).

Excerpt from Ultrasonics: Fundamentals and Applications (1992), pp. 380–393, 363–365.

Dennis L. Parker, et al., "Analysis of B–Scan Speckle Reduction by Resolution Limited Filtering," Ultrasonic Imaging 4, 108–125 (1982).

Deborah J. Rubens, M.D, et al., "Sonoelasticity Imaging of Prostate Cancer: In Vitro Results." Radiology, vol. 195, No. 2, 1995, 379–383.

C. B. Burckhardt, "Ultrasound Axiom: a device for focusing over a large depth," The Journal of the Acoustical Society of America, 54, 6 pp. 1628–1630 (1973).

B. Schrope, et al., "Simulated Capillary Blood Flow Measurement Using a Nonlinear Ultrasonic Contrast Agent." Ultrasonic Imaging 14, 134–158 (1992).

Abstracts, Journal of the American Society of Echocardiography, vol. 8, No. 3 pgs. 345–346, 355, 358–364, May–Jun. 1995.

"Supplement to Journal of the American College of Cardiology." American College of Cardiology, 45th Annual Scientific Session, Mar. 24–27, 1996 pgs. 21A, 63A, 239–240A.

"Small Spheres Lead to Big Ideas." Research News, Science vol. 267, Jan. 20, 1995.

"HP Ultrasound Technologies–Viability." About HP Ultrasound Imaging, WWW document, 1997.

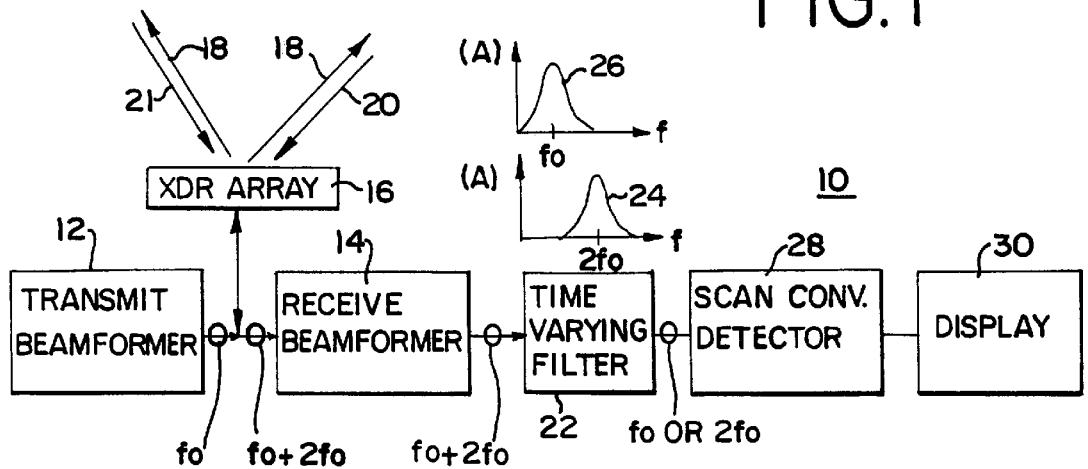
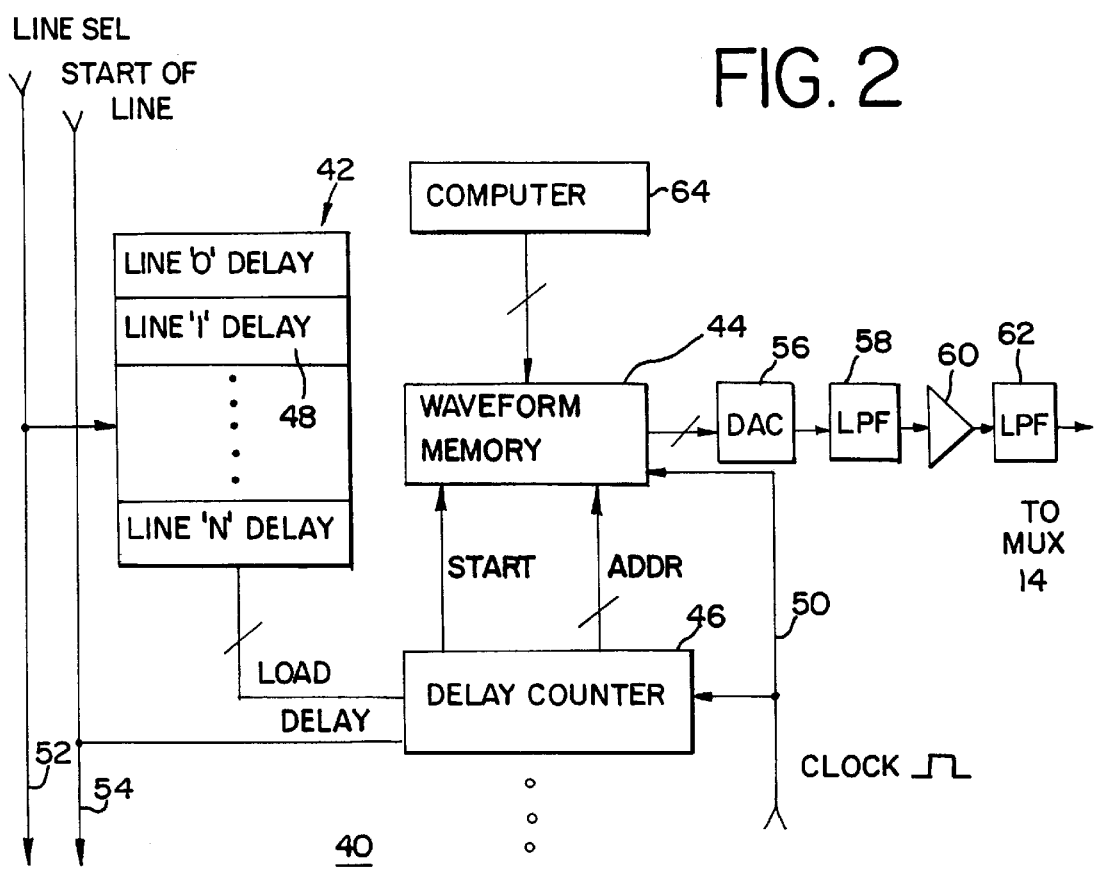

ULTRASONIC HARMONIC IMAGING SYSTEM AND METHOD

BACKGROUND

This invention relates to ultrasound imaging systems, and in particular to improved methods for reduced speckle imaging.

Speckle may be reduced with spatial compounding. Alternatively, data representing adjacent spatial regions in a two-dimensional image may be filtered. However, the filtering reduces resolution.

Frequency compounding may be performed to reduce speckle. Frequency compounding comprises combining data associated with one frequency with data associated with another frequency. Typically, the frequencies associated with the data correspond to transmitted frequencies. However, frequency compounding may not efficiently take advantage of other system processing.

Ultrasound systems may be designed to generate images as a function of harmonic echo information. The harmonic echo information may provide improved image resolution, but may still have speckle artifacts.

SUMMARY

The present invention is defined by the following claims, and nothing in this section should be taken as a limitation on those claims. By way of introduction, the system described below ultrasonically images a target with spread energy transmissions. Generally, ultrasonic energy corresponding to a line focus is transmitted into a target at a fundamental center frequency. The target may or may not include contrast agents. In either case, echoes are received at a harmonic of the fundamental center frequency. Echoes are also received at the fundamental center frequency. The echoes received at the harmonic center frequency are efficiently compounding with the echoes received at the fundamental center frequency.

BRIEF DESCRIPTION OF THE DRAWINGS

FIG. 1 is a block diagram of an ultrasonic imaging system suitable for use with the method of this invention.

FIG. 2 is a block diagram of a transmit beamformer suitable for use in the system of FIG. 1.

DETAILED DESCRIPTION OF THE PRESENTLY PREFERRED EMBODIMENTS

Figure 3:
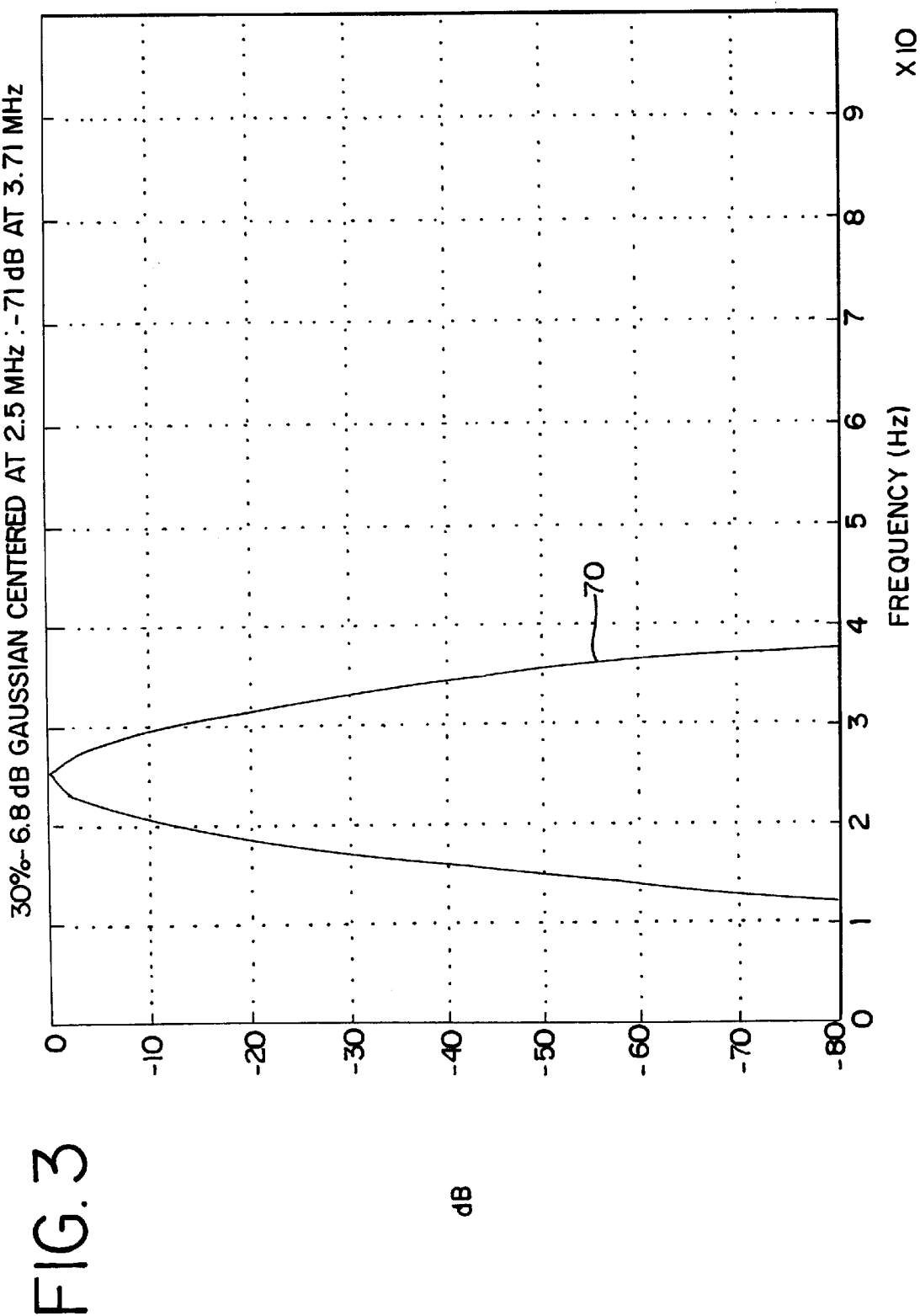
FIG. 3 is a graph of a Gaussian pulse in the frequency domain.

The preferred embodiments described below are designed to reduce harmonic energy in the transmitted beam, to provide an improved spatial distribution of fundamental energy in the transmitted beam, and to efficiently reduce speckle associated with data generated for harmonic and fundamental imaging.

GENERAL

FIG. 1 shows generally an ultrasonic imaging system 10 which can be used to practice the method of this invention. The system 10 includes a transmit beamformer 12 and a receive beamformer 14. These beamformers can take any desired form, either analog or digital, and they function generally in the conventional manner. In particular, the transmit beamformer generates transmit waveforms that are applied to a transducer array 16, which converts these transmit waveforms into ultrasonic energy that is directed along transmit beams 18 into a target, such as the body of a medical patient. Scattering sites within the target cause echo information to be returned to the transducer array 16. This echo information is converted by the transducer array 16 into electrical signals that are applied to the receive beamformer 14. The receive beamformer applies appropriate delays to form receive beams 20 in the conventional manner. The receive beams are used to generate and display an image using frequency compounding.

The ultrasonic echo information applied to the receive beamformer 14 will include echo information at the fundamental frequency band as well as echo information at a harmonic of the fundamental frequency band. In the following examples the harmonic of interest will be assumed to be the second harmonic ($2f_0$), though it should be understood that this invention can be applied generally to any suitable harmonic of the fundamental, including subharmonics and fractional harmonics, as well as higher harmonics (e.g., 2 or 3 times the fundamental). Of course, in the event that fundamental center frequency $f_0$ is changed, the center frequency of the corresponding harmonics will change as well.

The harmonic echo information may be generated by nonlinear interaction with tissue, contrast agents or combinations thereof. In preferred embodiments, contrast agent is not added to the patient or the imaged region. Alternatively, any suitable contrast agent may be used, as long as it absorbs ultrasonic energy at the fundamental frequency and radiates ultrasonic energy at the harmonic frequency when subject to a high intensity acoustic pulse.

TRANSMISSION

For improved isolation of the harmonic information, the transmit waveforms are shaped to suppress transmitted ultrasonic energy at frequencies near a harmonic of the fundamental frequency. The transmit waveforms generated by the transmit beamformer 12 are characterized by a peak power level near a fundamental frequency $f_0$ (such as 2.5 MHz for example). Various techniques for transmit waveform generation may be used, including the techniques disclosed in U.S. Pat. Nos. 5,740,128 and 5,608,690, and U.S. patent application Ser. Nos. 08/893,288, filed Jul. 15, 1997 and 09/081,918 (unassigned, filed May 19, 1998; Attorney Docket No. 5050/247). Preferably, the techniques described below are implemented in the transmit beamformer 12.

Turning now to FIG. 2, this figure shows a block diagram of a first preferred embodiment 40 of the transmit beamformer of FIG. 1. As shown in FIG. 2, the transmit beamformer 40 includes N channels, one for each of the transducers of the transducer array 16 (FIG. 1). Each channel includes a delay memory 42, a waveform memory 44, and a delay counter 46 (FIG. 2). The delay memory 42 includes 256 words 48, one for each possible steering angle or ultrasound transmit scan line. Each word 48 of the delay memory 42 is set equal to a negative number equal to the number of clock cycles on the clock signal line 50 that elapse between a start of line signal on line 54 and the first non-zero value of the associated waveform. For simplicity, it is assumed that zero is defined as a word 48 having the most significant bit equal to one and all other bits equal to zero. Hence, the most significant bit becomes an enable signal for the waveform memory 44.

The waveform memory 44 in this embodiment stores a single waveform in digital form, which may be used for all transmit scan lines. The waveform memory 44 can include for example 64 or 128 successive 8 bit words. The magnitude of each 8 bit word corresponds to the voltage amplitude at the respective position in the waveform. When the waveform memory 44 is read with a 40 MHz clock on the line 50, the resulting sequence of digital values defines a waveform approximately 1.6 to 3.2 microseconds in duration.

The delay memory 42 is not required, but it reduces memory requirements for the waveform memory 44. This is because the delay memory 42 eliminates the need to store a large number of leading zeros when the ultrasound line is steered at a large angle.

In use, each channel responds to a scan line selection signal on line 52 by loading the word 48 for the selected scan line into the-delay counter 46. The delay counter 46 responds to a start of scan line signal on line 54 by incrementing the stored value with each cycle of the 40 MHz clock on line 50. When the counter 46 increments to zero, it enables the waveform memory 44. Subsequently generated values of the counter 46 (incrementing now from zero upwards) become address values for the waveform memory 44. As each word of the waveform memory 44 is addressed, the corresponding 8 bit word is read and applied to a digital to analog converter 56.

The analog output signal of the converter 56 is passed through a low pass filter such as a Bessel filter 58 to reduce sampling effects and then to an amplifier 60. The output of the amplifier 60 can be passed through an additional low pass filter 62 to improve harmonic rejection. The output of the low pass filter 62 is the transmit waveform discussed above that is applied to the respective transducer element. The low pass filters 58, 62 preferably provide a sharp cut-off with a low stop band level in order substantially to eliminate ultrasonic energy in the transmitted pulse at the harmonic frequency.

The transmit beamformer 40 utilizes values for the waveforms stored in the waveform memory 44 and the delays stored in the delay memory 42 that enhance insonification for harmonic imaging.

The waveform stored in the waveform memory 44 is shaped to suppress ultrasonic energy in a wide pass band centered at the harmonic frequency. For example, the spectrum of the desired pulse can be designed on a computer 64. FIG. 3 shows the frequency spectrum of one suitable pulse 70 which is centered at the fundamental frequency of 2.5 MHz and is generally Gaussian in shape. The particular Gaussian shape shown in FIG. 3 has an amplitude reduced by 71 dB at 3.71 MHz. The bandwidth of the pulse 70 is 30% of the center frequency, measured at points −6.8 dB with respect to the peak amplitude. Such a pulse will be referred to herein as a 30% BW Gaussian pulse. Note that the pulse 70 has substantially no energy at 5 MHz, the first harmonic of the fundamental frequency. This invention is not limited to use with Gaussian pulses, and a wide range of spectra can be used.

Figure 4:
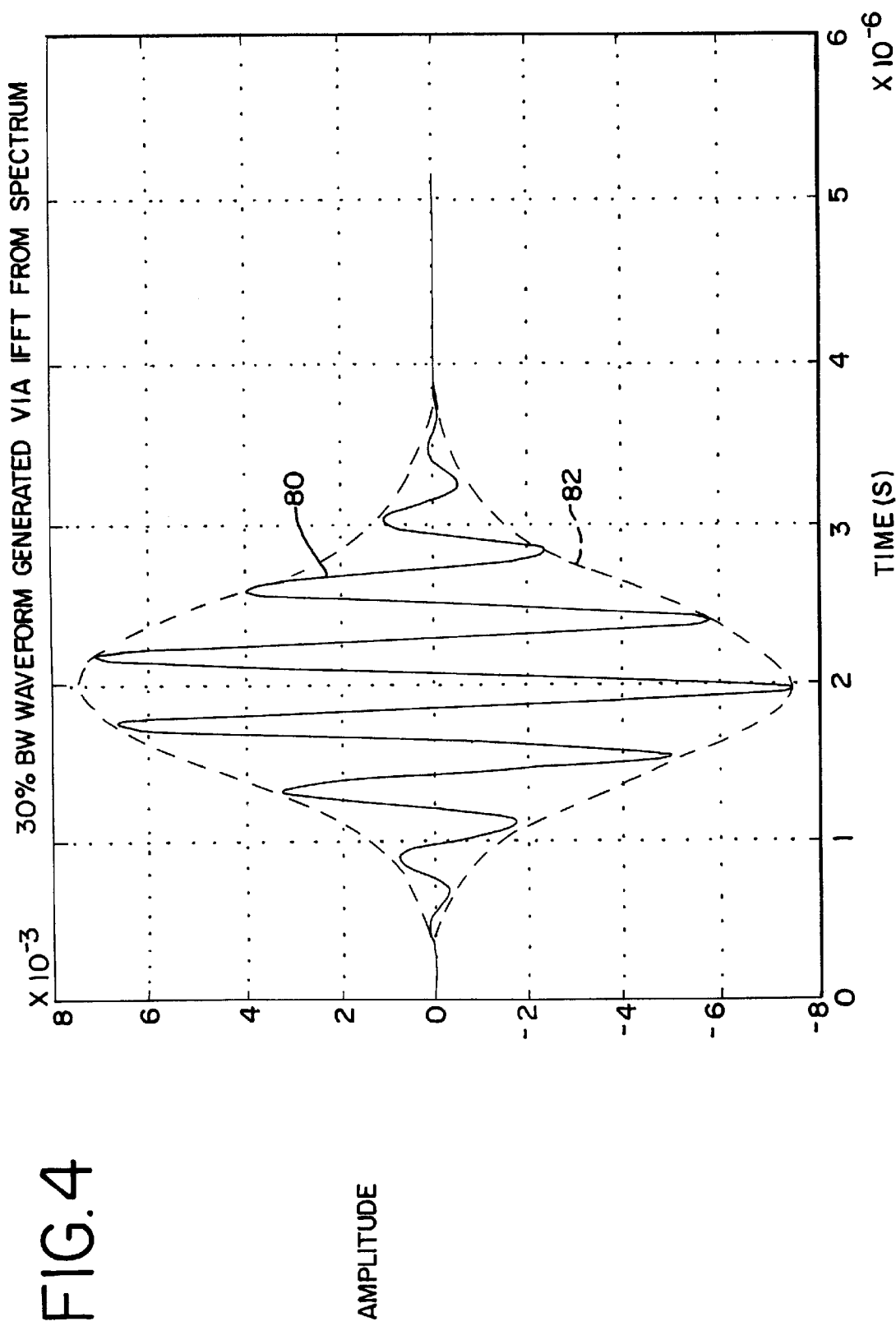
FIG. 4 is a graph of a waveform corresponding to the Gaussian pulse of FIG. 3 in the time domain.

Once the desired pulse has been designed, an inverse fast Fourier transform is then performed to generate the corresponding time domain waveform. FIG. 4 shows a waveform 80 which corresponds to the pulse 70 of FIG. 3. Note that the waveform 80 includes an oscillating component having a frequency of about 2.5 MHz, but other frequencies may be used. This oscillating component is shaped by an envelope 82. The envelope 82 rises gradually from zero amplitude to a maximum amplitude, and then falls gradually from the maximum amplitude back to zero amplitude. Thus, the envelope 82 is quite different from the envelope for a switched pulse train, which is substantially rectangular in shape. The gradually increasing and gradually decreasing envelope 82 of FIG. 4 brings with it the advantage of reduced ultrasonic energy at harmonics of the fundamental frequency.

Once a waveform such as the waveform 80 of FIG. 4 has been designed, the waveform 80 can be coded into binary samples at a suitable sample rate and then stored in the waveform memory 44 (see FIG. 2). The waveform memory 44 may be a read only memory, in which case the computer 64 may not be required to be connected to the transmit beamformer 40. Alternately, the waveform memory 44 may be a volatile memory which is programmed at power-up initialization by the computer 64. The computer 64 may perform any desired subset of the pulse designing steps described above. Typically, the desired pulse may be one of several selectable pulses included in a menu for user choice.

When the waveform in the waveform memory 44 is designed as described above, the result is a broad band waveform in the waveform memory 44 which simultaneously has substantially no radiated energy in a broad band centered on the harmonic. In the example of FIGS. 3 and 4, substantially no ultrasonic energy is radiated at frequencies above 4 MHz, or in a bandwidth of ±1 MHz with respect to the first harmonic (5 MHz). Preferably, the energy component at the harmonic is more than 30 dB reduced with respect to the magnitude of the fundamental frequency, and ideally is reduced by more than 40 dB.

Of course, it is not necessary to define the waveform 80 initially in the frequency domain. A Gaussian pulse can be defined in the time domain. Furthermore, the envelope need not be Gaussian, it may be some other window function such as a Hamming pulse, a modified Gaussian pulse, or any other suitable pulse. In some applications it may be preferable to use a narrow bandwidth pulse and thereby achieve a very high reduction of energy at the harmonic, since the harmonic of the lower bandedge is well above the upper bandedge. On other occasions it may be preferable to use a wider bandwidth pulse, for example, to obtain better axial (temporal) resolution. In this case, somewhat reduced reduction of energy at the harmonic may be accepted.

An alternative approach is to design the pulse 70 to ensure that substantially no energy is transmitted above 1.5 times the center frequency of the intended fundamental pulse (3.75 MHz in this case). It is preferable to limit low frequency energy in the transmitted pulse so that the harmonic energy associated with this frequency does not fall within the spectrum of the transmitted pulse. If the cut off frequency is 3.75 MHz, there should be very little transmitted energy below 1.875 MHz.

In designing the pulse 70 and the waveform 80, the Gaussian waveform may be passed through a high order, low pass filter to eliminate all harmonic energy. This filtering may be done off line in the computer 64.

Optimum imaging of the non-linear response of tissue or contrast agent is obtained when the transmit beam insonifies the tissue or agent at power levels within a desired range. Power levels below this range may not be sufficiently high to cause the contrast agent to radiate at the harmonic frequency. Power levels above this range may destroy the contrast agent prematurely. Additionally, since there are FDA limits on ultrasound intensity, a sharply focused transmit beam is not optimal. Such a sharply focused beam provides a high intensity (near the FDA limits) at the focus, but an intensity that is undesirably low at many other points along the associated receive scan line.

The receive beamformer 14 preferably receives samples along an entire scan line for each transmit event. For this reason, it is preferable that the region of insonification within the desired power level range be extended over a substantial portion of the length of the receive scan line. Thus, it is preferable that the intensity of the transmitted ultrasonic energy be substantially uniform and at a high level throughout the field of interest (which is typically a large fraction of the displayed depth), such as by transmitting with a line focus.

The delay memory 42 preferably stores delay values to provide a controlled spread to the beam intensity in a way to optimize harmonic imaging. Also, by making the intensity of harmonic energy received at the receive beamformer 14 more uniform throughout the field of interest, the levels of harmonic back scatter may be better controlled, resulting in manageable voltage swings at the receiver input.

Figure 5:
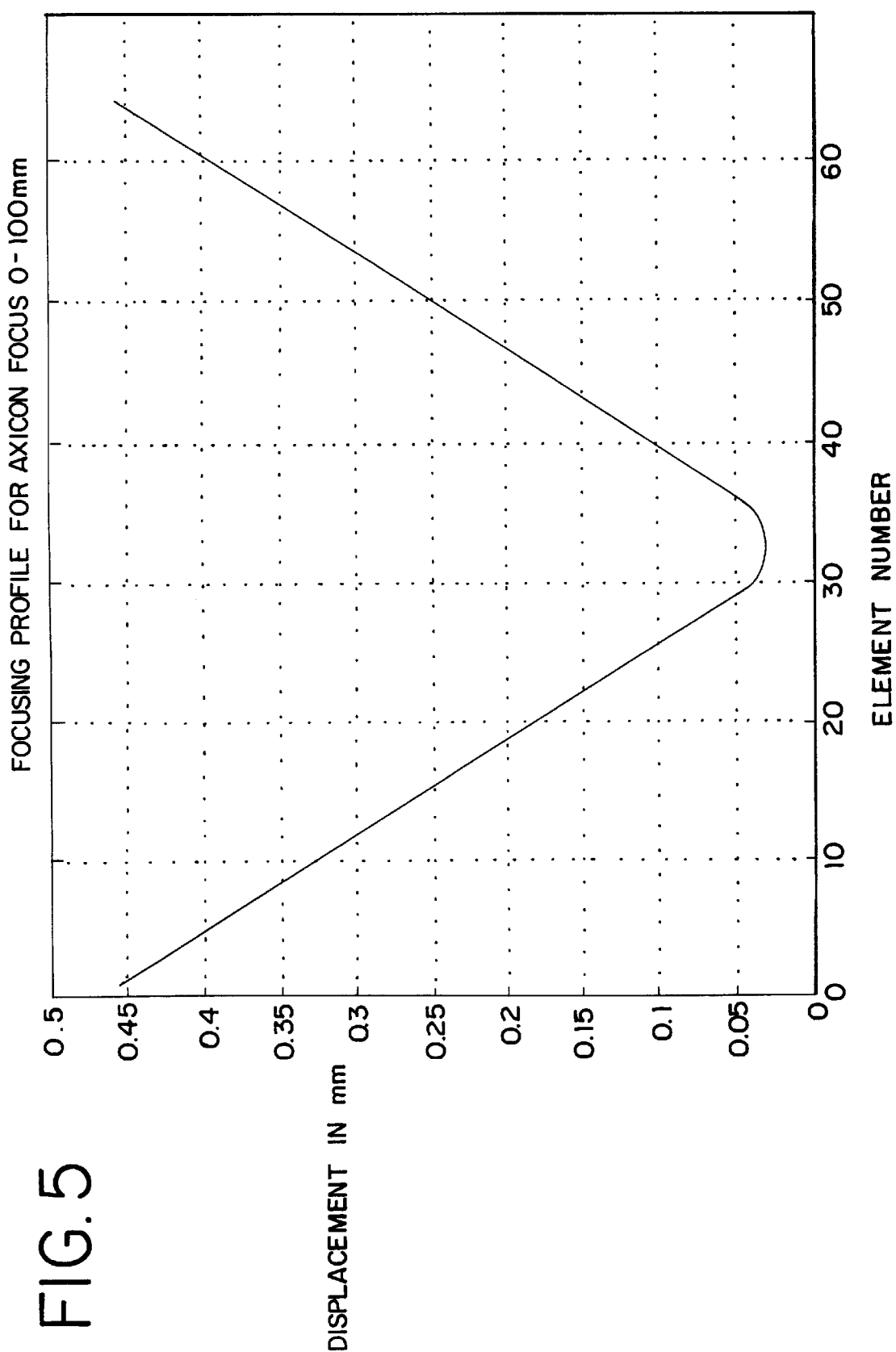
FIG. 5 is a graph of a focusing profile suitable for a line focus.

In this embodiment, the delay values stored in the delay memory 42 are selectively chosen to spread the beam along the current ultrasound line 18. One way to accomplish this is to use the well-known axicon or line focusing arrangement, as described, for example by C. Burckhardt in "Ultrasound Axicon: A Device for Focusing over a Large Depth" (J. Acoust. Soc. of Am., 54, 6, pp. 1628–1630 (1973)). The line focusing arrangement may utilize a focusing profile as shown in FIG. 5. This focusing profile provides a near focal limit corresponding to a circular arc centered on the near focal limit. The delay profile extends linearly outwardly from this circular arc to some outer limit, as shown in FIG. 5.

The objective is to spread the ultrasound energy throughout a region of the target, and many different delay profiles may accomplish this result. For example, the delay profile may be slightly curved, with a nonlinear variation of focal point with respect to transducer element position. There may be an outer focal limit, in which case the delay profile can include a circular portion at the ends of the array.

Figure 6:
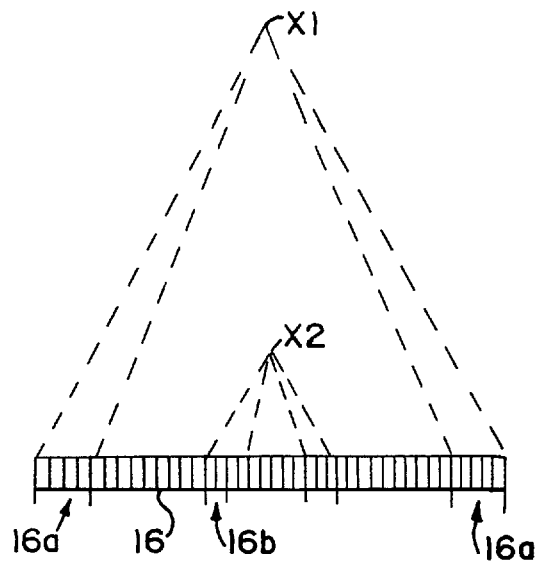
FIG. 6 is a schematic representation of a compound focus arrangement.

In many applications, it will be desirable to select the delay values in the delay memory 42 such that at least first frequency components of the transmit beam from at least a first plurality of transducer elements are focused at a first, shorter range, and that at least second frequency components of the transmit beam from at least a second plurality of transducers are focused at a second, longer range. One example is shown in FIG. 6, where substantially all of the ultrasonic energy from the transducers 16a at the end portions of the transducer array 16 are focused at a single longer range X1, and substantially all of the ultrasonic energy from the transducers 16b at central portions of the array are focused at a single, shorter range X2. By properly selecting the delay values, a line focus or a multiple-point compound focus may be obtained. When a line focus is used, the line may be straight or curved.

Another approach begins with focal delays required for a chosen focal point in the conventional manner. A random delay error is superimposed on these focal delays to smear or defocus the resulting beam. The greater the degree of defocusing, the more spread out the beam is. Preferably, a user control is provided to allow the user to vary the degree of defocusing by increasing the relative level of the defocusing delays. Also, it is preferable to increase the transmitted energy level to partially compensate for the loss of peak field intensity due to defocusing, either in an automatic (internally programmed) manner or under user control. The defocusing hardware can consist of a modified version of aberration correction hardware in which the delay corrections are pre-programmed random numbers rather than values which are continuously updated, for example by means of cross-correlating the waveforms from adjacent elements.

Conventional imaging at the fundamental frequency using a line or defocused beam is known to produce side lobes. However, such side lobes are not anticipated to create substantial problems in this application, particularly if the side lobes are below the harmonic activation threshold intensity and they therefore do not contribute to the generation of harmonic energy. Full dynamic receive focusing is preferably performed in the receive beamformer 14 to reduce the effect of side lobes in the transmit beam further.

Regardless of the precise configuration of the pulse 70 and the waveform 80, the waveform 80 preferably provides more uniform field intensity through a usefully extended depth of field. This results in more uniform generation of harmonic energy by the contrast agent or tissue and possibly a higher overall signal to noise ratio since more of the field is being insonified at a sufficiently high power level to cause the contrast agent or tissue to radiate harmonic energy. For contrast agents, a sufficiently low uniform power level to prevent unnecessarily rapid destruction of the contrast agent is preferably used. Alternatively, a high level of power throughout the field is maintained to destroy contrast agent.

If desired, the axicon focus may be obtained with a lens. Also, an axicon focusing scheme may be used in the elevation direction, if it is desired to increase the dimension of the insonified region in that direction.

The transmit beamformer 40 of FIG. 2 is quite similar to the beamformer shown in FIG. 13 of U.S. Pat. No. 5,608,690, and the techniques described above relating to Gaussian waveforms modified to provide a line focus can be performed in the manner described in the above-identified application. Note in particular pages 23 and 24 of the above-identified application as filed, which expressly relate to optimized transmit beamformers for use with contrast agents. With this approach, a plurality of transmit waveforms are provided, each for a respective one of the transducers of the transducer array. This plurality of transmit waveforms includes a central transmit waveform associated with a central one of the transducers.

Figure 7:
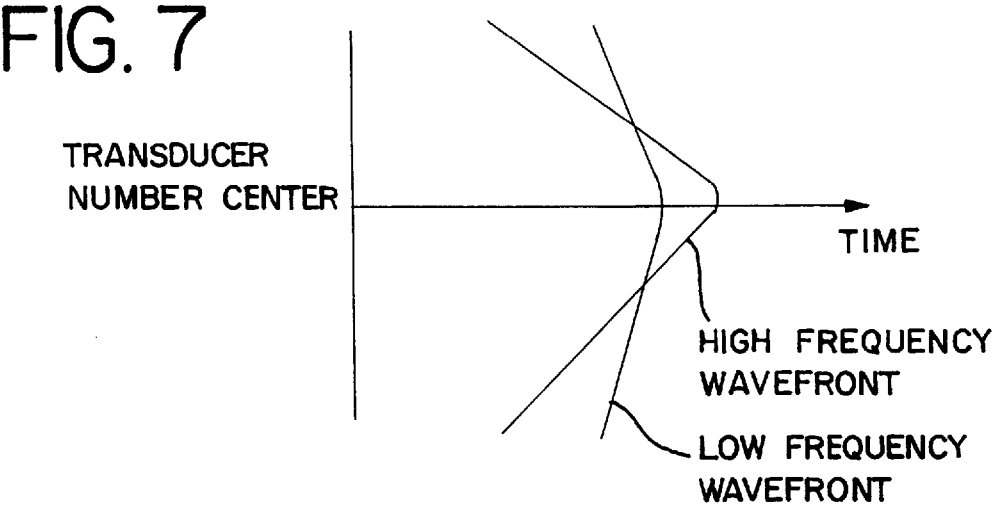
FIG. 7 is a graph showing high and low frequency wavefronts.

As explained in the above-identified patent application in detail, the central transmit waveform preferably comprises a lower frequency component and a higher frequency component, and a lower frequency component of the central transmit waveform occurs earlier in time than the higher frequency component of the central transmit waveform, as shown in FIG. 7. In this embodiment, multiple line focuses are used, each associated with different frequencies. FIG. 7 corresponds to FIG. 11 of above-identified U.S. Pat. No. 5,608,690, and that application can be referenced for additional information regarding these figures. When the system of U.S. Pat. No. 5,608,690 is adapted for use with this invention, it is preferred that the frequencies along the line focus all be near the fundamental frequency to insonify the contrast agent effectively for harmonic imaging.

Additionally, the transmit beamformer described in Cole, et al., U.S. patent application Ser. No. 08/286,652, filed Aug. 5, 1994, and in U.S. patent application Ser. No. 08/432,056, filed May 2, 1995 (now U.S. Pat. No. 5,675,554), both assigned to the assignee of the present invention, can be adapted for use with this invention. Once the desired output is defined as described above in terms of very low harmonic signal, one can then define the ideal output signal in the frequency domain and then convert it to the time domain. This time domain signal can then be divided by the carrier to obtain the desired envelope using complex shapes for both the time domain signal and the carrier. This combination of envelope and carrier can then be programmed into the transmit waveformer, using the parameters of attached Appendix 1. Appendix 1 provides parameters for both B-mode and Flow Mode. Appendix 3 provides a revised set of transmit beamformer parameters, and Appendix 4 provides a preferred set of transmit beamformer parameters adapted for use with the Acuson 3V2C transducer probe.

For example, the transmit beamformer 12 of this embodiment can be operated with a nominal center frequency FO equal to 5.0 MHz, a transmit carrier frequency $F_c$ equal to 2.5 MHz, and a Gaussian envelope having a 50% bandwidth at −6.8 dB with 8/4 envelope sampling. The envelope is sampled at a relatively low frequency, and as a result of imperfections in real implementations, remnants of harmonics relating to the sampling frequency of the carrier and the base band signal may appear in the final result.

Multiple simultaneous transmit zone firing (compound focus) may also spread the beam between two or more selected focal regions along a line. These techniques can also be implemented on the transmit beamformer described in U.S. Pat. No. 5,675,554 as described above.

The transmission techniques discussed herein may be used with various types of waveforms. It has been discovered that bipolar waveforms derived from switched DC levels or pulse wave generators can be filtered to provide effective suppression of ultrasonic energy at the harmonic. This can represent a substantial advantage, because bipolar, switched DC pulse sequences can be generated in a relatively inexpensive beamformer.

Of course, the techniques described above can be used in systems 10 which provide apodization in the normal manner. If desired, apodization profiles can be modified if experience shows that the contributions from the end transducer elements (which are focused at deep ranges) are too attenuated. In this case, it may be preferable to increase the weighting at the end elements to compensate for this effect to some extent. By operating the to end transducer elements at higher power levels, more nearly uniform power levels are obtained at various ranges in the tissue being imaged.

A further modification is to use fewer transmit lines than receive lines. Since contrast agent tends to be consumed by the insonification process, it is preferable to reduce the number of transmit lines by reducing the frequency of firings and/or the spatial density of lines. Reduced firings and density can be achieved by firing one fourth the number of transmit lines and forming four synthetic receive lines closely spaced around each transmit line, which may be slightly defocused if required. Wright, et al. U.S. Pat. No. 5,667,373, assigned to the assignee of the present invention, discloses synthetic line systems that can be adapted for this purpose. Furthermore, frames of low intensity ultrasound may be interleaved with high intensity frames.

RECEIVE

The ultrasonic echo information signal generated by the transducer 16 includes information at the fundamental frequency and information generated non-linearly at the harmonic frequency. Preferably, little ultrasonic energy is transmitted at the harmonic frequency. Additionally, the receive beamformer 14 isolates the harmonic frequency information by substantially removing information at transmitted frequencies.

In the embodiment of FIG. 1, the receive beamformer 14 generates receive beams 20 that are applied to a filter 22. As shown in FIG. 1, the receive beams 20 applied to the filter 22 include ultrasonic echo information at both the fundamental and the harmonic frequency bands. As shown in FIG. 1, the filter 22 is controlled such that the passband of the filter 22 may change with time. The passband of the filter 22 is centered at the harmonic frequency $2f_0$ for isolating harmonic information, and at the fundamental frequency $f_0$ for isolating fundamental information. This is schematically shown in the two curves of FIG. 1. The curve 24 shows the harmonic passband, and the curve 26 shows the fundamental passband of filter 22. Thus, the output of the filter 22 is substantially restricted to fundamental or to harmonic components of the received echo information. The filtered output of the filter 22 is applied to a conventional scan converter and detector system 28, which provides image data for display on a display 30, such as by frequency compounding.

Figure 8:
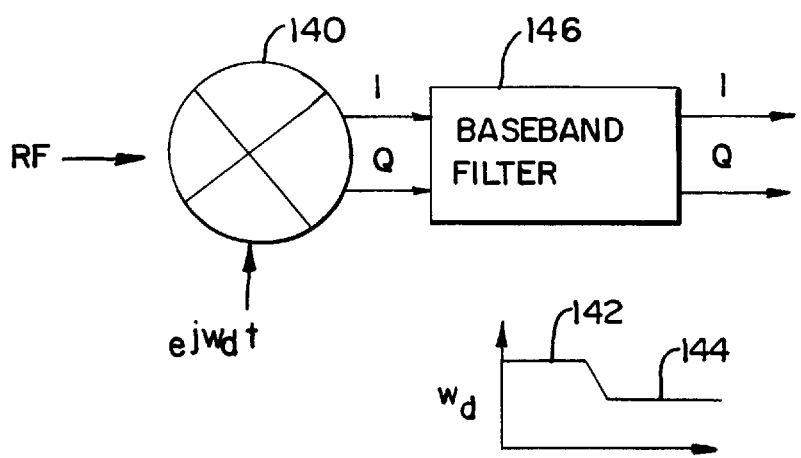
FIG. 8 is a schematic diagram of an alternate filtering approach suitable for use in the system of FIG. 1.

In the embodiment of FIG. 8, the time varying filter is implemented using demodulation techniques. In particular, a broadband RF signal is applied to a multiplier 140 that also receives a demodulation signal. This demodulation signal is characterized by a demodulation frequency as shown at 142. The demodulation frequency shifts from a higher frequency for isolating harmonic components of the ultrasound echo information to a lower frequency for isolating fundamental components of the ultrasound echo information. The output of the multiplier 40 is in the I.Q. format and is applied to a baseband filter 46. Thus, the multiplier 40 operates to mix the broadband receive signal with a sinusoidal signal having a time varying center frequency. For each receive beam, either the harmonic component of the receive signal that is centered at 0 Hz or the fundamental frequency is centered at 0 Hz. The lowpass filter 46 removes components at higher frequencies, thereby substantially eliminating the fundamental frequency components for harmonic imaging and the harmonic frequency components for fundamental imaging.

Time varying passband filters are used in other ultrasonic imaging applications as discussed in U.S. Pat. Nos. 4,016,760 and 5,218,869 and in U.S. patent application Ser. No. 08/432,615, filed May 2, 1995, assigned to the assignee of the present invention.

Figure 9:
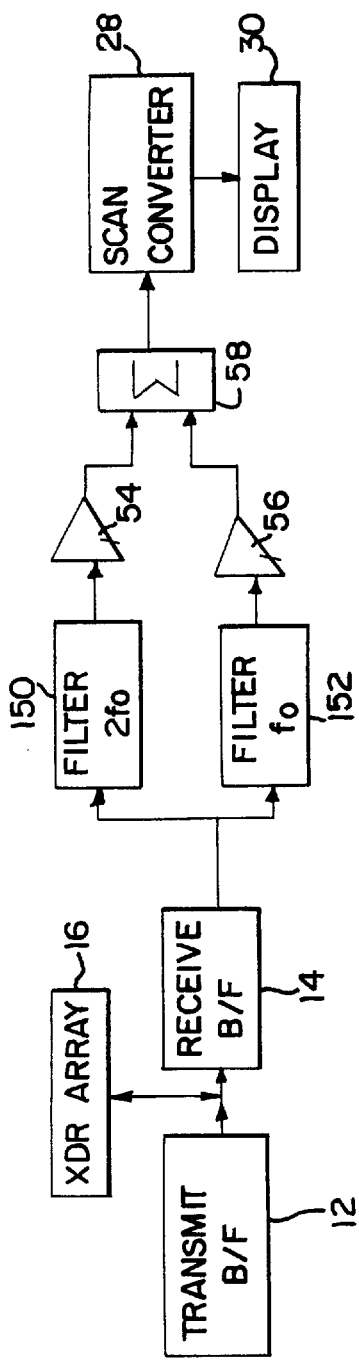
FIGS. 9 and 10 are block diagrams of alternate embodiments of ultrasonic imaging systems suitable for use with this invention.

FIG. 9 shows another embodiment in which the echo ultrasound information supplied by the receive beamformer is applied to two bandpass filters 50, 52. The bandpass filter 50 passes the harmonic component of the received ultrasonic energy while blocking the fundamental component, and the filter 52 passes the fundamental component of the received ultrasonic energy while blocking the harmonic component. The filtered outputs of the filters 50, 52 are applied to gain amplifiers 54, 56, and the outputs of the amplifiers 54, 56 are applied to a summer 58. The summer 58 operate to compound the harmonic and fundamental component information as discussed below. In alternative embodiments, the summer 58 is placed in the processing path after detection processing.

The approach described above in conjunction with FIG. 9 can be implemented using demodulators for the filters 50, 52 to emphasize respective passbands of the broadband receive signal. As used herein, the harmonic and fundamental components of the received ultrasonic energy correspond to signals which are responsive to the components in the harmonic and fundamental ultrasonic passbands when in the acoustic domain, respectively. For this reason, the harmonic and fundamental components may be processed either as RF signals with typical frequencies of 2–20 MHz or as baseband signals with frequencies near 0 Hz.

For use with the transmit beamformer described in Cole, et al., U.S. patent application Ser. No. 08/286,652, filed Aug. 5, 1994, and in U.S. patent application Ser. No. 08/432,056, filed May 2, 1995 (now U.S. Pat. No. 5,675,554), the fundamental and harmonic energy is processed using the receive beamformer described in Wright, et al. U.S. patent application Ser. No. 08/286,658, filed Aug. 5, 1994, and in U.S. patent application Ser. No. 08/432,615, filed May 2, 1995, both assigned to the assignee of the present invention. This receive beamformer can be programmed using the parameters of attached Appendix 2. Other parameters may be used. The number of receive beams is 2 in this example.

Any suitable technique can be used to isolate the harmonic and fundamental components in the received signals. In addition to the demodulation techniques and the filters described above, filters can be used before the received signals are applied to the receive beamformer, and alternate channel phasing techniques can be used. All such approaches are encompassed within the term "means for receiving."

Figure 10:
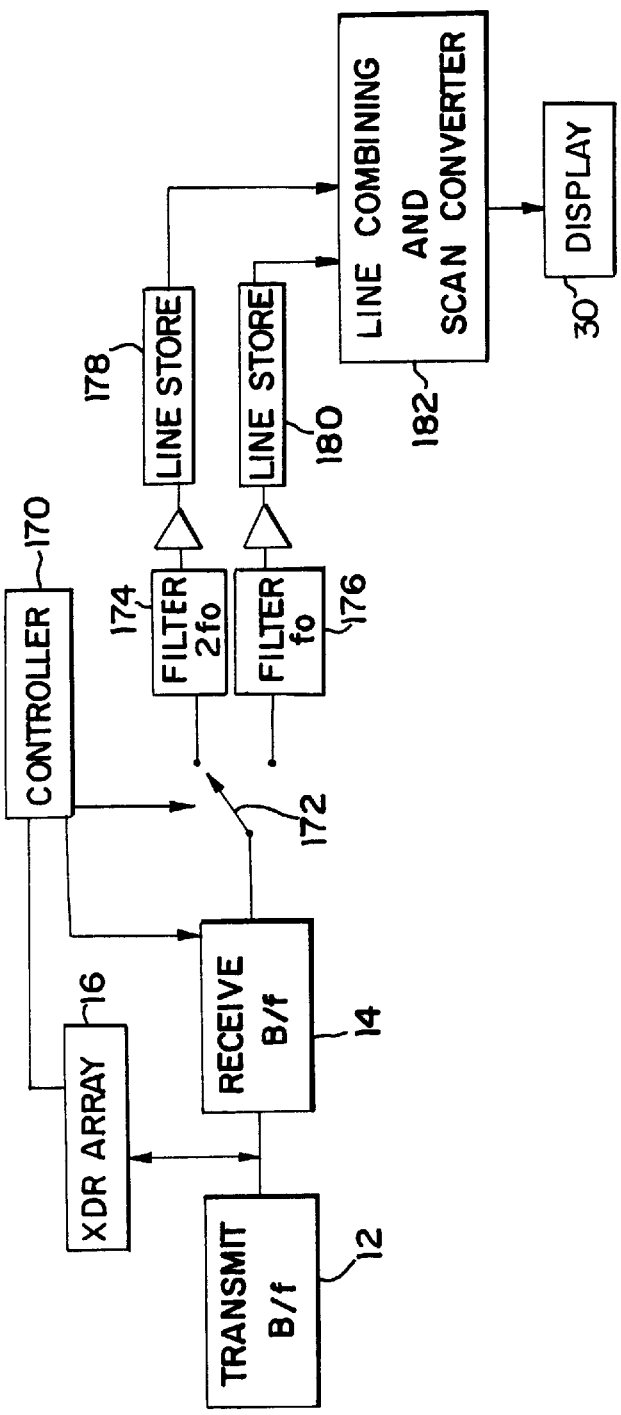

It is not essential in all embodiments that both the fundamental and the harmonic components for the image be obtained from a single firing or transmit event. In the system shown in FIG. 10, a controller 170 controls the transmit and receive beamformers 12, 14 and a switch 172 such that two or more transmit beams are fired for each beam direction (i.e., two or more transmit events for each beam direction). The respective receive beams are analyzed separately. For example, the controller 170 can position the switch 172 such that one of each set of receive beams is processed by the filter 174 and then stored in the line store 178, while another receive beam within each set is directed to the filter 176 and stored in the line store 180. In this embodiment the filter 176 is a passband filter that is centered at the fundamental frequency $f_0$, while the filter 174 is a passband filter that is centered at the harmonic frequency $2f_0$. The scan converter 182 selects appropriate portions of the information stored in the stores 78, 80 to frequency compound the data as discussed below. Although not shown in FIG. 10, the filters 174, 176 could be replaced with a single filter with switchable components. Also, if the receive signals are filtered prior to beamforming, the beamformer can be made to operate in a narrower band of operation, which may be less expensive to implement. Alternatively, the filter 22 (FIG. 1) is adjusted as a function of transmit event to isolate harmonic or fundamental components. The isolated information is stored for frequency compounding.

As yet another alternative implementation, it is possible to duplicate all or essentially all of the components of the receive beamforming hardware, and then to compound the fundamental and harmonic components after duplicate processing. As an example, the receive beamformer may be duplicated, and signal mixing can be performed in the scan conversion stage. It is anticipated that the duplication of hardware, though technically feasible, will in many applications increase the overall cost of the system.

COMPOUNDING

After isolating data associated with fundamental components and data associated with harmonic components, the data is compounded. The isolated data is compounded prior to or as part of display. The isolated data may include pre-detected, post-detection, image or data from other portions of the processing path.

The data, whether separated harmonic and fundamental components or combined data, is detected and scan converted in scan converter and detector 28. As discussed above, the scan converter and detector 28 may include a memory and a summer for compounding. The summer comprises digital or analog circuitry for compounding, such as a look-up-table addressed by harmonic and fundamental component values representing the same spatial region of a patient. The look-up-table is programmed with a mapping function representing the compounding function and outputs combined or frequency compounded data. The compounded data is used to generate an image or a portion of an image on the display 30.

Compounding includes any of various functions, such as averaging, weighted averaging, summing, other linear functions and nonlinear functions. For weighted compounding, the proportion of the contribution of each of these components can best be determined from experimental observation.

The advantage of a frequency compounded image is that coherent speckle effects are reduced, while signal components associated with tissue structure are summed. This results in an image which has a contrast characteristic that allows regions of slightly differing back scatter intensity to be more easily differentiated. In this embodiment, data generated for harmonic imaging (i.e., harmonic frequency data) is combined with fundamental frequency data. Thus, the harmonic and fundamental frequency data is efficiently used to generate an improved image.

In order to obtain the advantages of frequency compounding, it is important that the amplitudes of the harmonic and fundamental signals be matched. As used herein, matched amplitude refers to mean pixel amplitudes that are substantially equal to one another by a factor of plus or minus 50% over an image region such as a substantially constant range band. More preferably, matched amplitudes are equal to one another across a region of the image by plus or minus 25%, and most preferably by plus or minus 10%.

For example, the fundamental and harmonic image signals may be processed via separate signal paths in parallel, or by means of sequential operation using successive fundamental and harmonic modes along the same beam direction. The resulting fundamental and harmonic image data is subjected to depth dependent gain adjustment so as to form two amplitude-matched image data sets capable of producing approximately uniform images. These two images (one at the fundamental band and the other at the harmonic band) are then summed or averaged to produce a frequency compounded image.

The intensity correction method used to produce amplitude-matched images of the fundamental and harmonic components may be based on the circuit disclosed in Klesenski U.S. Pat. No. 5,579,768, assigned to the assignee of the present invention, or any suitable alternative approach. For example, the variations of gain may be estimated and a stored compensation function applied to the beamform signals. Alternately, carefully chosen filter characteristics may be used so that both the fundamental and harmonic components are approximately equalized in amplitude in the raw input signal form. In this case the compounding may be achieved at the final stage when the signals are detected prior to image display.

Using the line focus with frequency compounding provides a more uniform intensity signal along the acoustic line, which may result in better amplitude matching for compounding. Less stringent requirements for focal gain compensation and less drop-out in nonlinear response away from the focus may allow for advantageous harmonic imaging. Less variations by tissue type and more uniform identification of harmonic signal above any noise are provided with a line focus. Furthermore, using a line focus may allow an increased frame rate as compared to sequential transmissions focused at different depths. The increased frame rate may better allow sequential transmission and reception for obtaining both fundamental and harmonic information without degradation of the real time displayed images.

All of the harmonic imaging techniques described above can be used in both tissue and contrast agent harmonic imaging modes. In the tissue harmonic imaging mode, no additional non-linear contrast agent is added to the target, and only the non-linear characteristics of the tissue are relied on to create the ultrasonic image. Medical ultrasound imaging is typically conducted in a discrete imaging session for a given subject at a given time. For example, an imaging session can be limited to an ultrasound patient examination of a given tissue of interest over a period of ¼ to 1 hour, though other durations are possible. In this case no additional non-linear contrast agent is introduced into the tissue at any time during the imaging session.

In the contrast agent harmonic imaging mode, any one of a number of well known non-linear contrast agents such as FS069 from Molecular Biosystems, San Diego, Calif., can be added to the target in order to enhance the non-linear harmonic response of the tissue. For this reason, it should be understood that the introduction of an added non-linear contrast agent into the tissue being imaged is not implied in any of the following claims unless such added non-linear contrast agent is expressly recited.

The systems described above can use the transmit beamformers described in U.S. Pat. No. 5,608,690, which focuses different frequency components at different ranges. Also, as described above, these techniques can be used with other beamformers which utilize other transmit waveforms or receive beamformer processes. Other compounding, such as spatial or temporal compounding, may also be used. It is intended that the foregoing detailed description be regarded as illustrative rather than limiting. It is the following claims, including all equivalents, which are intended to define the scope of this invention.

APPENDIX 1

Parameters for Transmit Beamformer
(all references are to FIG. 3 of U.S. Patent Application Ser. No. 08/432,056)

| Parameter | Corresponds to | Value |
|---|---|---|
| h2 | FIR filter h2 of T312 | (1 4 6 4 1) |
| h3 | FIR filter h3 of T324 | (1 0 −2 0 1) |
| Ku2 | Upsampler of T326 | 2 |
| Ku1 | Upsampler of T312 | 2 (determined by: Ku1 = Nb*4/Ku2) |
| h4 | FIR filter h4 of T326 | (2 3 2) |
| Nb | Number of transmit beams | 1 |
| cw_on | | 0 -> pulsed mode |
| Envelope Type, beam 0 | 'Env len' of FIG. 4 | 0 -> real |
| Ns | | B-mode: 17 |
|   |   | F-mode: 23 |
| h1 | Envelope in T304 | B-mode: (0.0039, 0.0156, 0.0430, 0.1133, 0.2461, 0.4531, 0.7031, 0.9141, 0.9961, 0.9141, 0.7031, 0.4531, 0.2461, 0.1133, 0.0430, 0.0156, 0.0039) (33% Gaussian, sampled at Fe = 10 MS/s) F-mode: (0.0039, 0.0078, 0.0195, 0.0430, 0.0898, 0.1719, 0.2930, 0.4531, 0.6406, 0.8203, 0.9492, 0.9961, 0.9492, 0.8203, 0.6406, 0.4531, 0.2930, 0.1719, 0.0898, 0.0430, 0.0195, 0.0078, 0.0039) (25% Gaussian, sampled at Fe = 10 MS/s) |
| phi | Phase to be applied at T310 | See definition of phi below |
| Fs | Sampling Freq at O/P of T328 | 40 MS/s |
| Fe | Sampling Freq of envelope in T304 | 10 MS/s (determined from above based |

APPENDIX 1-continued

| | | |
|---|---|---|
| | | on: Fe = Fs/Ku1/Ku2 |
| Fpa select | v_phi = Fc/F0 | 0 -> use modulation frequency for focusing |
| Fm/F0 | v = Fc/F0 | 0.5 (Fm = 2.5 MHz; F0 = 5.0 MHz) |
| F0 | | 5.0 MHz |

Together these terms, plus the fact that the envelope is real, are used to calculate the phase applied in complex multiplier T310, as described in Application Ser. No. 08/432,056. In particular, this phase is broken into:
envelope phase: zero because envelope is real
fine focusing: calculated from the difference between quantized and deal delay, using the phase alignment frequency vphi = v
modulation: complex multiplier T310 includes a component which corresponds to modulation to a frequency (Fm/F0 − 1)*F0. This modulation, in combination with later modulation in complex muliplier T318, results in an overall effective modulation frequency Fm.
phi = phi_D + phi_E = phi_R
phi_D   (Phase portion of delay (fine focusing)) = −2.(pi).v_phi.tau_phi
    tau_phi = low order portion of the delay word representing fractional units of T0(1/F0) as in Pat. Appl. 08/432,056. This is the portion of the specified focusing delay which is applied via phasing rather than true time delay.
phi_E = 0(Waveform sample phase is zero because envelope is real)
phi_R = 2.(pi).kul.(v − 1).n/4 (n is the successive sample number)
This is a phase rotation of 2.(pi).(Fm − F0).t where t = kul.t/(4.F0)

APPENDIX 2

Parameters for Receive Beamformer
(all references are to FIG. 3 of U.S. Patent Application Ser. No. 08/432,615)

| Parameter | Corresponds to | Value |
|---|---|---|
| Fs | Sampling rate Fs at ADC | 40 MS/s |
| Nb | Number of receive beams | 2 |
| Kd1 | Downsampler of R162 | 2 |
| h1 | FIR filter h1 of R160 | (2 3 2) (selected based on Kd1) |
| h1 bypass | | disabled |
| h2 | FIR filter h2 of R164 | (1 0 −1) |
| h2 bypass | | disabled |
| h3 | FIR filter h3 of R167 | (1 4j −8 −10j 8 4j −1) |
| h3 bypass | | disabled |
| Kd2 | Downsampler of R169 | 4 (determined by Kd2 = Nb*4/Kd1) |
| Fb | | 5 MS/s (determined from above, based on Fb = Fs/Kd1/Kd2) |
| Fp select | | 0 -> Fp = Fstart |
| Fp select | | 1 -> Fp = Fstart − Fdownslope*R |
| Fstart/F0 | Fstart | B-mode: Fstart/F0 = 1.1172 (5.5859 MHz) |
| | | F-mode: Fstart/F0 = 1.0781 (5.3906 MHz) |
| Fdownslope | (DELTA F sub downshift) | B-mode: Fdownslope = 1.793E − 4 F0/T0 <-> 5821 Hz/mm |
| | | F-mode: Fdownslope = 1.144E − 4 F0/T0 <-> 3716 Hz/mm |
| Tbreak | | Tbreak >= 1792 T0 (276 mm) |
| Fupslope | | 0 |
| Base Band Filter | | |
| Ntaps | | 16 |
| type | | real |
| L/M ratio | | 1/1 (based on L = 1, M = 1) |
| hbbf | Base band filter coefficients | (based on L = 1, M = 1) |
| | | B-mode: hbbf = (0, 0, 0, 0, 0, 0.0195, 0.0996 0.2285, 0.2988, 0.2285, 0.0996, 0.0195, 0, 0, 0, 0) |
| | | F-mode: hbbf = (0, 0, 0, 0.0020, 0.0137, 0.0469, 0.1172, 0.1992, 0.2383, 0.1992, 0.1172, 0.0469, 0.0137, 0.0020, 0, 0) |
| | | Baseband filter is an FIR operating on the output of the receive beamformer |

APPENDIX 3

Revised Parameters for Transmit Beamformer
All parameters are as defined in Appendix 1 and are set equal to the values of Appendix 1 except as noted.

H3 = [1 0 −1]
Ns = 17 (B-mode)
17 (F-mode)

B-mode Envelope = [.01171875 .03125 .078125 .16796875 .3203125
.52734375 .75 .9296875 .99609375 .9296875
.75 .52734375 .3203125 .16796875 .078125
.03125 .01171875]
(29% Gaussian, sampled at Fe = 10 MS/s)

F-mode Envelope = [.015625 .0390625 .08984375 .19140625 .34375
.546875 .765625 .93359375 .99609375 .93359375
.765625 .546875 .34375 .19140625 .08984375
.0390625 .015625]
(30% Gaussian, sampled at Fe = 10 MS/s)

APPENDIX 4

Second Revised Parameters for Transmit Beamformer
(Adapted for use with Acuson 3V2C Probe)
All parameters are as defined in Appendix 1 and
are set equal to the values of Appendix 1 except as noted.

H3 = [1 0 −1]
Ku2 = 4
Ku1 = 1
Ns = 27

Envelope = [0.015625 0.03125 0.0546875 0.08984375
0.140625 0.21484375 0.30859375 0.41796875
0.546875 0.6796875 0.80078125 0.90625
0.97265625 0.99609375 0.97265625 0.90625
0.80078125 0.6796875 0.546875 0.41796875
0.30859375 0.21484375 0.140625 0.08984375
0.0546875 0.03125 0.01562500]
(33% Gaussian, sampled at Fe = 14 MS/s)

Fs = 56 MS/s
Fe = 14 MS/s
F0 = 3.5 MHz

We claim:

1. An ultrasonic method for generating data for imaging comprising the following steps:

(a) transmitting ultrasonic energy at a fundamental frequency;

(b) focusing the ultrasonic energy in step (a) in a transmit beam having a line focus;

(c) receiving reflected ultrasonic energy at a harmonic of the fundamental frequency and at the fundamental frequency; and (d) compounding the reflected ultrasonic energy associated with the fundamental frequency with the reflected ultrasonic energy associated with the harmonic frequency, whereby data for imaging is generated in response to the compounded energy.

2. The method of claim 1 wherein step (a) comprises generating a transmit waveform characterized by substantially reduced harmonic content.

3. The method of claim 1 wherein step (c) comprises substantially excluding said fundamental frequency from the reflected ultrasonic energy at the harmonic.

4. The method of claim 1 further comprising (e) detecting said generated data, and wherein step (d) comprises compounding the detected data.

5. The method of claim 1 wherein:

step (a) comprises transmitting the ultrasonic energy sequentially; and step (c) comprises receiving the reflected ultrasonic energy associated with the harmonic sequentially with receiving the reflected ultrasonic energy associated with the fundamental frequency.

6. The method of claim 1 wherein step (d) comprises averaging.

7. The method of claim 1 wherein step (b) comprises focusing with an axicon beam.

8. An ultrasonic system for generating data for imaging comprising:

means for transmitting ultrasonic energy at a fundamental frequency and for focusing the ultrasonic energy in a transmit beam having a line focus;

means for receiving reflected ultrasonic energy at a harmonic of the fundamental frequency and at the fundamental frequency; and means compounding the reflected ultrasonic energy associated with the fundamental frequency with the reflected ultrasonic energy associated with the harmonic frequency.

* * * * *

UNITED STATES PATENT AND TRADEMARK OFFICE
CERTIFICATE OF CORRECTION

PATENT NO. : 5,957,852
DATED : September 28, 1999
INVENTOR(S) : John A. Hossack et al.

It is certified that error appears in the above-identified patent and that said Letters Patent is hereby corrected as shown below:

In column 3, line 29, please change "the-delay" to --the delay--.

In column 7, line 57, please change "the to end" to --the end--.

In column 12, line 17, please change "Calif." to --California--.

Signed and Sealed this

Twenty-eighth Day of November, 2000

Attest:

Q. TODD DICKINSON

Attesting Officer

Director of Patents and Trademarks